Jan. 13, 1925.
C. J. WINKLER ET AL
1,523,094
FAN CONSTRUCTION
Filed July 15, 1921
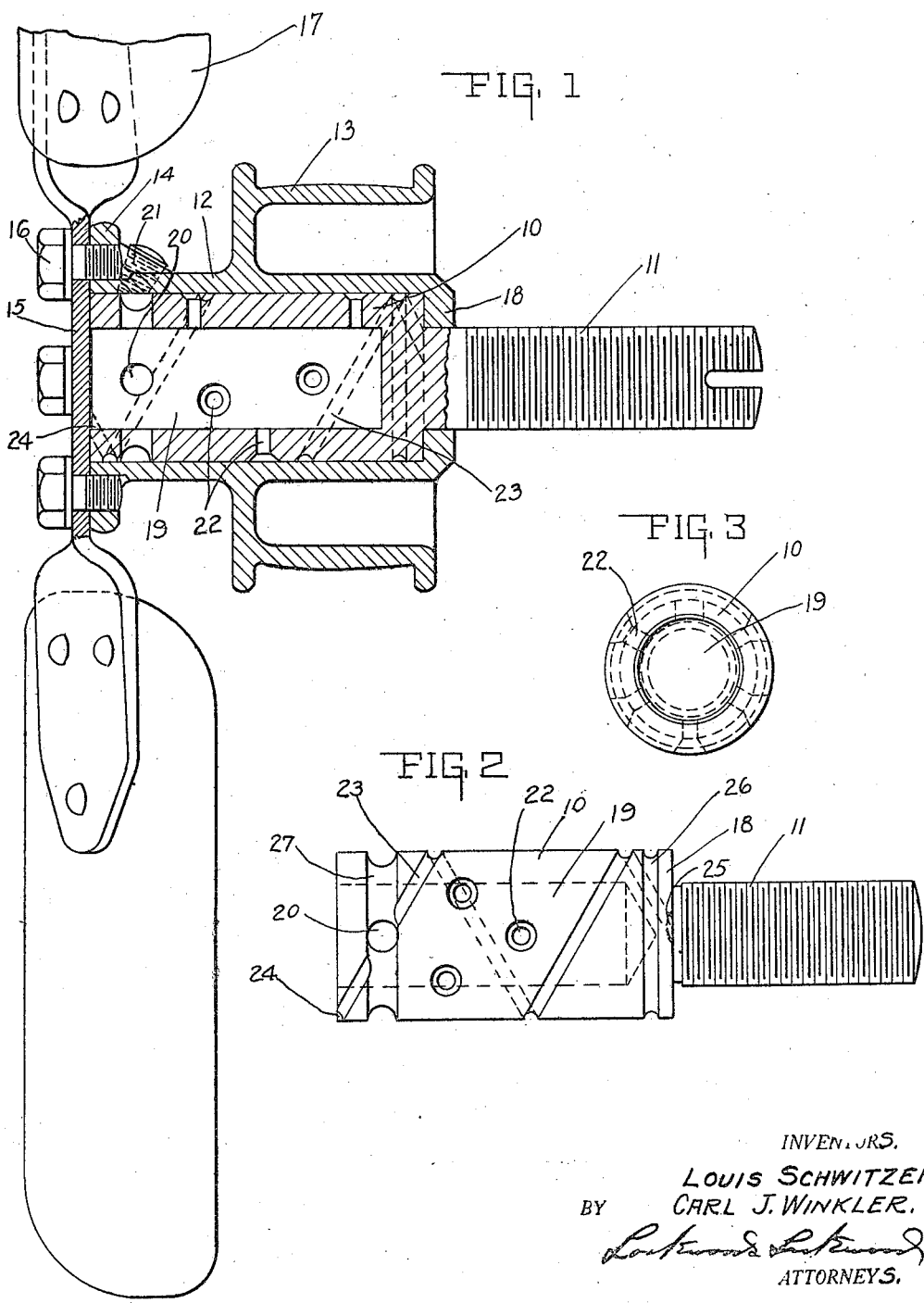
INVENTORS.
LOUIS SCHWITZER.
BY CARL J. WINKLER.
ATTORNEYS.

Patented Jan. 13, 1925.

1,523,094

UNITED STATES PATENT OFFICE.

CARL J. WINKLER AND LOUIS SCHWITZER, OF INDIANAPOLIS, INDIANA, ASSIGNORS TO AUTOMOTIVE PARTS COMPANY, OF INDIANAPOLIS, INDIANA, A CORPORATION.

FAN CONSTRUCTION.

Application filed July 15, 1921. Serial No. 485,043.

*To all whom it may concern:*

Be it known that we, CARL J. WINKLER and LOUIS SCHWITZER, respectively citizens of the United States and residents of Indianapolis, county of Marion, and State of Indiana, have invented a certain new and useful Fan Construction; and we do hereby declare that the following is a full, clear, and exact description thereof, reference being had to the accompanying drawings, in which like numerals refer to like parts.

This invention relates to a fan construction adapted for use in connection with internal combustion engines, and more particularly to a simplified hub and spindle construction, and manner of lubricating the same.

The main object of the invention is to construct a fan hub and spindle, or shaft, as the case may be, whereby it may be more cheaply and simply manufactured than such devices of the same strength and wearing ability, the supported rotating member may be easily and accurately balanced, the bearing surfaces may be properly lubricated from an oil reservoir and by oil grooves wholly in the spindle, and leakage around the spindle will be largely or wholly prevented. This is accomplished by constructing a substantially larger spindle or shaft than is usually the case, providing a large bearing surface, and eliminating the use of the usual ball or roller bearings, packing rings, and other structural elements. The construction is also such that the usual end thrust bearings may be eliminated, in view of the large end bearing surfaces of the spindle or shaft, and the fastening means of the bearing assembly and spindle inside the hub are entirely eliminated.

A further feature of the invention resides in the provision of a spiral peripheral recess or conduit formed in the spindle and having one end extending into one of the thrust bearing surfaces so as to provide a cut-out scoop portion, said recess extending about the peripheral bearing surfaces toward the other end and communicating with the lubricant chamber. The cut-out scoop portion extending into one of the thrust bearing surfaces is adapted to scrape into the peripheral recess, the excess lubricant from about the thrust bearing surface, the longitudinal extending portion of the recess being adapted to scrape up the lubricant from about the peripheral bearing of the spindle. By means of this arrangement the excess lubricant is gathered up by the peripheral recess both from the thrust bearing and the peripheral bearing portion and carried to the lubricant chamber, whereby the usual packing elements and other structure necessary to lubricate the bearing surfaces and prevent leaking may be eliminated. This permits of an extremely simple device consisting in only two parts, namely, the spindle and the hub, which provide the necessary lubricating means, bearing surfaces, locking means, etc., while doing away with the usual number of parts commonly used in such structures for preventing leakage of lubricant and providing proper bearing surfaces and the like.

The full nature of the invention will be understood from the accompanying drawings and the following description and claims.

In the drawings, Fig. 1 is a central vertical section through the hub portion of a fan. Fig. 2 is a side elevation of the spindle. Fig. 3 is an end view of Fig. 2.

In the drawings there is shown a fan construction having a substantially cylindrical spindle 10 integral with and supported upon the end of the stud 11. The stud 11 is adapted to be screwed into the forward portion of the internal combustion engine upon which the fan is mounted and securely locked therein against movement in the usual manner. Surrounding the spindle 10 and free to revolve thereon, there is a hub 12 which is slidable as a unit onto the spindle from the rear, and upon which hub is the belt pulley 13, in this case made integral therewith. The hub portion 12 is provided with the usual flange 14 at the front end thereof, to which the fan spider 15 is rigidly secured by the bolts 16 for carrying the fan blades 17. The rear end of the hub 12 has an inwardly projecting flange 18 to bear against the rear end of the spindle 10; the flange 18 fits fairly closely around the stud 11.

The spindle 10 is of comparatively large diameter so as to provide an extensive bearing surface which might be said to be substantially equal to the bearing surfaces of the crank shaft, and is hollow in the center to form the lubricant chamber 19. Said lubricant chamber is open at the front and closed at the rear, said front opening being closed by the solid center of the fan spider 15. For filling the hollow inner lubricant chamber 19 with lubricant, there is provided in the spindle a passageway 20 opening into a groove 27, said groove in turn registering with a filling aperture in shell 12, which aperture is closed by the screw plug 21.

The spindle 10 is provided with a plurality of lubricating passages 22 which are disposed radially thereof at varying angles to each other from the center of the spindle so as to extend in all directions. This arrangement is such that regardless of the positioning of the spindle in mounting it in position, the lubricant carried in the chamber 19 will seep in between the bearing surfaces by gravity through the passages which extend downwardly. The lubricant contained in the chamber passes downwardly by gravity through the passages 22 between the bearing surfaces at the lower side thereof, the lower side having a clearance between the two surfaces due to the weight of the hub and the downward pull of the fan belt. The rapid rotation of the hub about the spindle carries the lubricant about the surface thereof, and necessitates some means for returning the excess lubricant to the chamber and prevent its leakage about the end thrust-bearing at the rear. This means is provided by forming the peripheral recess 23 about the bearing surface of the spindle extending from end to end, so that the edge of the recess scrapes along the inner surface of the hub during the rotation thereof, gathering up all excess lubricant and carrying it forward to be returned to the chamber either at the end of recess 24, or through the annular groove 27 and passage way 20 adjacent thereto. The peripheral recess 23 forms or is provided at its rear end with a cutout scoop portion 25 adapted to gather up and carry forward any lubricant which may seep into the rear thrust bearing at the flange 18. This peripheral recess 23, in connection with the annular groove 26 positioned near the rear of the spindle, prevents any of the lubricant escaping at the rear of the spindle, so that the usual packing may be eliminated. There would only be sufficient lubricant at this point to lubricate the rear thrust bearing surfaces, and the balance will be picked up and carried forward to the forward thrust bearing, or the lubricant chamber 19. There is an annular groove 27 of substantially larger diameter than the groove 26 positioned about the periphery of the forward end of said spindle, registering with the opening and the plug 21 in the hub, and communicating with the passage 20 into the chamber, whereby said chamber may be filled with lubricant from the exterior upon removal of said plug. It is obvious with respect to the peripheral recess 23 that it may be placed either about the periphery of the spindle or about the inner bearing surface of the hub, and function in the same manner, but we prefer to place it in the spindle so that the hub may have a smooth drilled hole within it.

By this arrangement, we can avoid all lubricating chambers in the rotatable member, and make the hub of a single casting with no cored chambers other than the one for the spindle itself. By thus eliminating all such chambers in the hub, we can balance the rotatable member easily, accurately, quickly and cheaply, as well as being able to cast it in the first place more cheaply and with less labor.

The invention claimed is:

1. In a fan construction, a spindle having spaced thrust bearing surfaces, the said spindle having a lubricant chamber opening out at one end of the spindle, a hub rotatable on said spindle, a plate secured to said hub enclosing and engaging one of said thrust bearing surfaces, a spiral peripheral recess extending about the outer surface of said spindle communicating at one end with one of said thrust bearing surfaces so as to provide a scoop portion for gathering and conveying the lubricant therefrom to the other end of the spindle for returning it to said chamber, said recess being also adapted to gather excess lubricant from about the periphery of the spindle for returning it to said chamber, and a plurality of radial openings formed in said spindle establishing communication between said chamber and the peripheral bearing surface.

2. In a fan construction, a spindle an enlarged portion forming part of said spindle and providing a shoulder at the juncture of the larger and smaller portion thereof for providing an inner thrust bearing surface, the enlarged portion of the spindle being hollow to provide a lubricant chamber opening at its outer end, the end of said enlarged portion adjacent the open end of said chamber forming an outer thrust bearing surface, a hub rotatably carried by said enlarged portion, and an inwardly extending flange formed on said hub abutting said inner thrust bearing surface, a plate secured to the outer end of the hub for engaging the outer thrust bearing surface and covering the open end of said chamber, a spiral peripheral recess formed in the exterior surface of said enlarged bearing portion and constituting a continuous scraper for carrying excess lubricant about said surface and discharging it into said chamber, and a plurality of openings formed in said enlarged bearing portion for establishing communication between said chamber and peripheral bearing surface.

In witness whereof, we have hereunto affixed our signatures.

CARL J. WINKLER.
LOUIS SCHWITZER.